(12) United States Patent  
McCarthy et al.

(10) Patent No.: US 12,005,498 B2  
(45) Date of Patent: Jun. 11, 2024

(54) ADDITIVE MANUFACTURING SYSTEMS AND METHODS INCLUDING BUILD CHARACTERISTIC CONTRIBUTION PROFILES

(71) Applicant: General Electric Company, Schenectady, NY (US)

(72) Inventors: Brian Scott McCarthy, Schenectady, NY (US); Aymeric Moinet, Schenectady, NY (US); Rajesh Kartik Bollapragada, Niskayuna, NY (US); Tyler Nathaniel Nelson, Schenectady, NY (US)

(73) Assignee: General Electric Company, Schenectady, NY (US)

(*) Notice: Subject to any disclaimer, the term of this patent is extended or adjusted under 35 U.S.C. 154(b) by 374 days.

(21) Appl. No.: 16/943,799

(22) Filed: Jul. 31, 2020

(65) Prior Publication Data

US 2022/0032367 A1 Feb. 3, 2022

(51) Int. Cl.
*B22F 10/00* (2021.01)
*B22F 10/80* (2021.01)
(Continued)

(52) U.S. Cl.
CPC .............. *B22F 10/00* (2021.01); *B22F 10/80* (2021.01); *B22F 12/49* (2021.01); *B29C 64/386* (2017.08);
(Continued)

(58) Field of Classification Search
CPC ......... B33Y 10/00; B33Y 50/00; B33Y 50/02; B29C 64/386; B22F 12/49; B22F 10/85;
(Continued)

(56) References Cited

U.S. PATENT DOCUMENTS 9,696,142 B2 7/2017 Bamberg et al.
9,999,924 B2 6/2018 Dave et al.
(Continued)

FOREIGN PATENT DOCUMENTS

CN 104084584 A 12/2015
JP 2017179517 10/2017
(Continued)

OTHER PUBLICATIONS

Zhang, et al., Defect Formation Mechanisms in Selective Laser Melting, Chin. J. Mech. Eng. Apr. 2017, pp. 515-527.
(Continued)

*Primary Examiner* — Moshe Wilensky
(74) *Attorney, Agent, or Firm* — Hanley, Flight & Zimmerman, LLC

(57) ABSTRACT

An additive manufacturing system includes a control system communicatively coupled to a consolidation device and configured to control operation of the consolidation device. The control system is configured to generate a model of a component including a plurality of elements and at least one region of interest. The control system is also configured to apply at least one strain load to at least one element of the plurality of elements and generate a build characteristic contribution profile based on the at least one strain load. The control system is further configured to determine a build parameter based at least partly on the build characteristic contribution profile.

20 Claims, 7 Drawing Sheets

(51) Int. Cl.
   *B22F 12/49*   (2021.01)
   *B29C 64/386*  (2017.01)
   *B33Y 50/00*   (2015.01)
   *B22F 10/10*   (2021.01)
   *B33Y 10/00*   (2015.01)
   *B33Y 50/02*   (2015.01)

(52) U.S. Cl.
   CPC .............. *B33Y 50/00* (2014.12); *B22F 10/10* (2021.01); *B33Y 10/00* (2014.12); *B33Y 50/02* (2014.12)

(58) Field of Classification Search
   CPC .......... B22F 10/36; B22F 10/28; B22F 10/00; B22F 10/80; B22F 10/10
   See application file for complete search history.

(56) References Cited

U.S. PATENT DOCUMENTS

| | | | |
|---|---|---|---|
| 10,183,330 B2 | 1/2019 | Buller et al. | |
| 10,207,454 B2 | 2/2019 | Buller et al. | |
| 10,286,603 B2 | 5/2019 | Buller et al. | |
| 10,307,823 B1 | 6/2019 | Deaton, Jr. et al. | |
| 2016/0246908 A1* | 8/2016 | Komzsik | B29C 67/00 |
| 2017/0197278 A1 | 7/2017 | Garry et al. | |
| 2018/0161875 A1 | 6/2018 | Buller et al. | |
| 2018/0356778 A1 | 12/2018 | Acharya et al. | |
| 2019/0077077 A1 | 3/2019 | Martin et al. | |
| 2019/0232428 A1 | 8/2019 | Roychowdhury et al. | |

FOREIGN PATENT DOCUMENTS

| | | |
|---|---|---|
| WO | 2018233866 A1 | 12/2018 |
| WO | 2020019404 A1 | 1/2020 |

OTHER PUBLICATIONS

Mugwagwa et al., Evaluation of the impact of scanning strategies on residual stresses in selective laser melting, The International Journal of Advanced Manufacturing Technology. Feb. 2019, pp. 2441-2450.

European Patent Office, "Search Report," issued in connection with European application No. 21187922.6-1103, dated Dec. 2, 2021, pp. 14.

Pellens Jeroen et al: "Topology optimization of support structure layout in metal-based additive manufacturing accounting for thermal deformations", Structural and Multidisciplinary Optimization, Springer Berlin Heidelberg, Berlin/Heidelberg, vol. 61, No. 6, Apr. 8, 2020 (Apr. 8, 2020), pp. 2291-2303, XP037180085, ISSN: 1615-147X, DOI: 10.1007/S00158-020-02512-8.

Lin Cheng et al: "On utilizing topology optimization to design support structure to prevent residual stress induced build failure in laser powder bed metal additive manufacturing", Additive Manufacturing, vol. 27, Mar. 9, 2019 (Mar. 9, 2019), pp. 290-304, XP055728997, NL ISSN: 2214-8604, DOI: 10.1016/j.addma.2019.03.001.

Chen Qian et al: "A level-set based continuous scanning path optimization method for reducing residual stress and deformation in metal additive manufacturing", Computer Methods in Applied Mechanics and Engineering, North-Holland, Amsterdam, NL, vol. 360, Nov. 20, 2019 (Nov. 20, 2019), XP085977130, ISSN: 0045-7825, DOI: 10.1016/J.CMA.2019.112719.

* cited by examiner

ADDITIVE MANUFACTURING SYSTEMS AND METHODS INCLUDING BUILD CHARACTERISTIC CONTRIBUTION PROFILES

BACKGROUND

The field of the disclosure relates generally to additive manufacturing, and more particularly, to additive manufacturing systems and methods for fabricating a component using a build characteristic contribution profile.

At least some known additive manufacturing systems involve the consolidation of a particulate to fabricate a component. Such techniques facilitate producing complex components from expensive materials at a reduced cost and with improved manufacturing efficiency. At least some known additive manufacturing systems, such as Direct Metal Laser Melting (DMLM), Selective Laser Melting (SLM), Direct Metal Laser Sintering (DMLS), and Laser-CUSING® systems, fabricate components using a focused energy source, such as a laser device or an electron beam generator, a build platform, and a particulate, such as, without limitation, a powdered metal. (LaserCUSING is a registered trademark of Concept Laser GmbH of Lichtenfels, Germany.)

Additively manufactured components have build characteristics that are influenced by the design and formation of the components during the additive manufacturing process. Accordingly, the build characteristics may vary from desired values in different regions of the components due to variances during the design and formation of the component. For example, some components may include areas of high stress or deformations that could lead to undesirable anomalies in the component. In other embodiments, the build characteristics of the component inhibit the formation of a desired anomaly in a region of interest. In further embodiments, it may be desirable to provide localized control of build characteristic within the component. For example it may be beneficial for selected areas of the component to have a build characteristic (e.g., anisotropic) or to have a reduced probability of having a specified build characteristic (e.g., porosity).

In at least some known systems, models of the components are evaluated to locate areas having high stress or deformations. Based on the evaluated models, the build parameters of the entire component or the region of interest are modified to influence the build characteristics of the region of interest. However, altering the build parameters of the entire component or the region of interest may have an undesirable effect on the build characteristics (e.g., an increase in the stress or deformation of the region of interest).

Accordingly, there is a need for systems that facilitate localized control of build characteristics of additively manufactured components in comparison to conventional systems.

BRIEF DESCRIPTION

In one aspect, an additive manufacturing system is provided. The additive manufacturing system includes a control system communicatively coupled to a consolidation device and configured to control operation of the consolidation device. The control system is configured to generate a model of a component. The model includes a plurality of elements and at least one region of interest. The control system is also configured to apply at least one strain load to at least one element of the plurality of elements and generate a build characteristic contribution profile based on the at least one strain load. The build characteristic contribution profile represents an effect of the at least one strain load applied to the at least one element on a build characteristic of at least one location within the at least one region of interest. The control system is further configured to determine a build parameter based at least partly on the build characteristic contribution profile.

In another aspect, a method of fabricating a component is provided. The method includes generating a model of the component. The model includes a plurality of elements and at least one region of interest. The method also includes applying a strain load to at least one element of the plurality of elements and generating a build characteristic contribution profile for the at least one element of the plurality of elements. Each build characteristic contribution profile represents an effect of the at least one strain load applied to the at least one element on a build characteristic of at least one location within the at least one region of interest. The method further includes determining a build parameter based on the build characteristic contribution profile.

In yet another aspect, a build characteristic contribution evaluation module for an additive manufacturing system is provided. The build characteristic contribution evaluation module includes at least one processor in communication with at least one memory device. The at least one processor is programmed to generate a model of a component. The model includes a plurality of elements and at least one region of interest. The build characteristic contribution evaluation module is also configured to apply at least one strain load to at least one element of the plurality of elements, and generate a build characteristic contribution profile based on the at least one strain load. The build characteristic contribution profile represents an effect of the at least one strain load applied to the at least one element on a build characteristic of at least one location within the at least one region of interest. The build characteristic contribution evaluation module is further configured to determine a build parameter based at least partly on the build characteristic contribution profile.

DRAWINGS

These and other features, aspects, and advantages of the present disclosure will become better understood when the following detailed description is read with reference to the accompanying drawings in which like characters represent like parts throughout the drawings, wherein.

Figure 1:
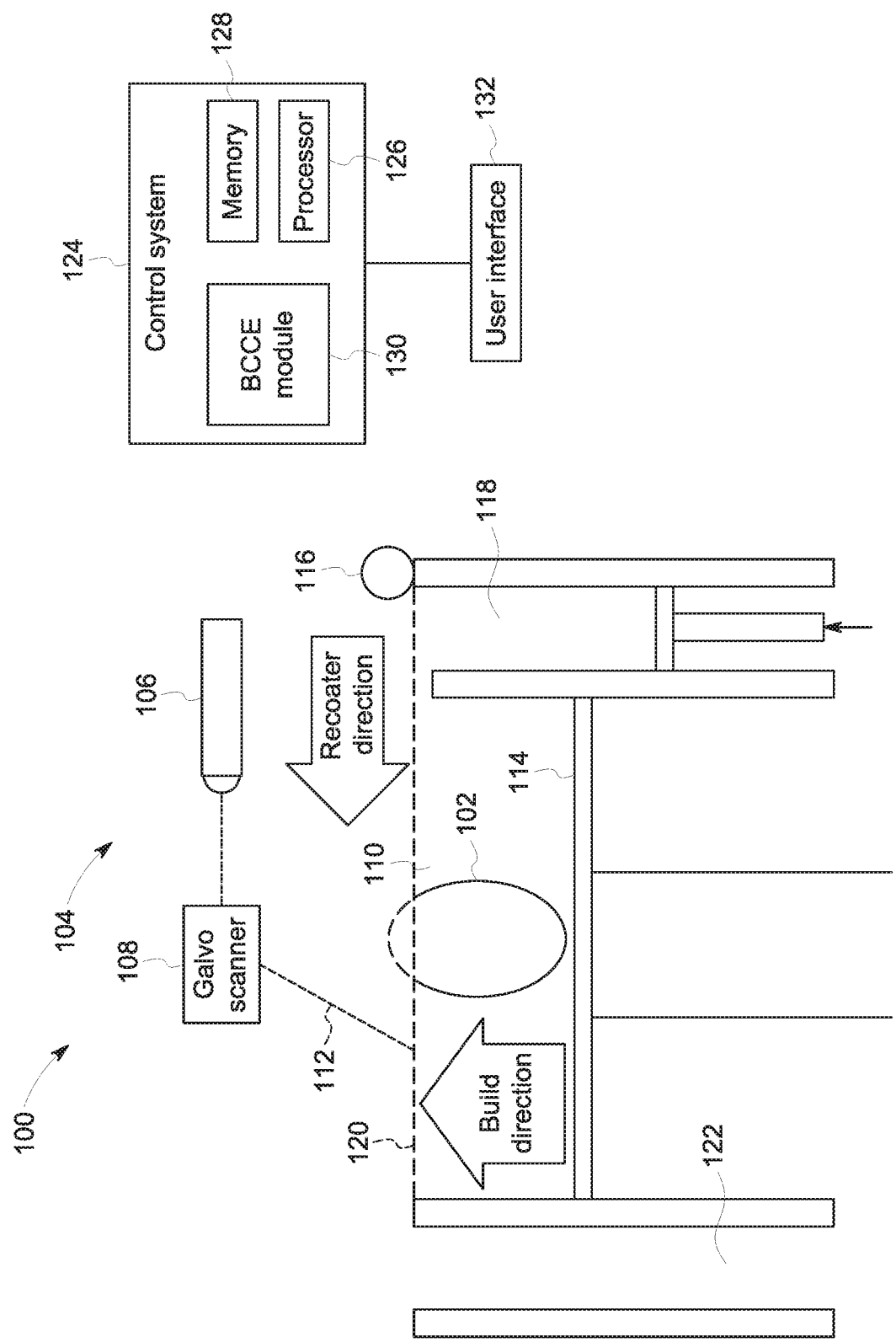
FIG. 1 is a schematic view of an exemplary additive manufacturing system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Additive manufacturing processes and systems include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling ProJet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. These processes and systems may employ, for example, and without limitation, all forms of electromagnetic radiation, heating, sintering, melting, curing, binding, consolidating, pressing, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

As used herein, the term "build parameter" refers to any value relating to the fabrication of a component. For example, build parameters may include an operational setting of an additive manufacturing system, a design parameter of the component fabricated by the additive manufacturing system, and/or a characteristic relating to a scan by the additive manufacturing system on a particulate surface and/or the melt pool formed by the additive manufacturing system.

The systems and methods described herein include an additive manufacturing system including a build characteristic contribution evaluation module. The build characteristic contribution evaluation module is configured to generate a model of the component with a plurality of elements and at least one region of interest. For example, the elements may be three-dimensional elements such as voxels or tetrahedral elements that are arranged in an array to represent a three-dimensional object. The build characteristic contribution evaluation module is configured to determine build characteristic contribution profiles for the elements and identify one or more elements that contribute to the build characteristic of the region of interest. For example, the build characteristic contribution profiles may include stress contribution profiles that relate stress contributions of the one or more elements to potential build parameters (e.g., scan directions of the consolidation device) at the location of the elements. The build characteristic contribution evaluation module is configured to determine and output a build parameter for the component based on the build characteristic contribution profiles. For example, the build characteristic contribution evaluation module may be configured determine a scan strategy including at least one of a scan path direction at the location of the at least one element and a scan delay at the location of the at least one element. A consolidation device of the additive manufacturing system may operate in accordance with the scan strategy to consolidate a particulate to form the component. Also, the build characteristic contribution evaluation module may be configured to determine at least one of a power setting of a consolidation device, a focus setting of a consolidation device, a scan spacing, a layer thickness, and/or any other build parameter. As a result, the additive manufacturing system is able to identify elements that will provide a desired change in the build characteristics of the region of interest and fabricate the components in accordance with a build parameter determined based on the identified elements to control the build characteristics of the additively manufactured component.

FIG. 1 is a schematic view of an exemplary additive manufacturing system 100. Additive manufacturing system 100 builds objects, for example, a part or component 102. In the exemplary embodiment, additive manufacturing system 100 includes a consolidation device 104 including a laser device 106 and a scanning device 108. Additive manufacturing system 100 is configured for fabricating component 102 using a layer-by-layer manufacturing process by sintering or melting a particulate 110 using an energy beam 112 generated by a source such as laser device 106. For example, in some embodiments, additive manufacturing system 100 is used for direct metal laser sintering (DMLS) or direct metal laser melting (DMLM). Laser device 106 provides a high-intensity heat source configured to generate a melt pool in a bed of particulate 110 using energy beam 112. Alternatively, consolidation device 104 may include any component that facilitates consolidation of a material using any of the processes and systems described herein.

In the exemplary embodiment, additive manufacturing system 100 further includes a build platform 114, a recoater arm 116, and a reservoir 118. During operation of additive manufacturing system 100, particulate 110 is supplied by reservoir 118 and spread evenly over build platform 114 using recoater arm 116. Recoater arm 116 is configured to maintain the particulate at a particulate level 120 and remove excess particulate material extending above particulate level 120 to a particulate container 122. Energy beam 112 consolidates particulate 110 to form a cross-sectional layer of component 102. After selective consolidation of the layer of particulate 110, build platform 114 is lowered and another layer of particulate 110 is spread over build platform 114 and component 102, followed by successive consolidation of the layer of particulate 110 by laser device 106. The process is repeated until component 102 is completely built up from the consolidated portion of particulate 110.

In the exemplary embodiment, additive manufacturing system 100 includes a control system 124. Control system 124 may include any suitable type of control system that enables system 100 to function as described herein. In the exemplary embodiment, control system 124 includes at least one processor 126 and at least one memory device 128. Processor 126 executes executable instructions to control the operation of additive manufacturing system 100 based at least partially on instructions from human operators. Control system 124 may include, for example, a 3D model of component 102 to be fabricated by additive manufacturing system 100. Executable instructions executed by control system 124 may include controlling the power output of laser device 106 and controlling a position and scan speed of scanning device 108. Control system 124 may include, for example, a calibration model of additive manufacturing system 100 and an electronic computer build file associated with a component, such as component 102. The calibration model may include, without limitation, an expected or desired melt pool size and temperature under a given set of operating conditions (e.g., a power of laser device 106) of system 100. The build file may include build parameters that are used to control one or more components of system 100. For example, build parameters may include, without limitation, a power of laser device 106, a scan speed of scanning device 108, a position and orientation of scanning device 108, a focus of scanning device 108, a scan spacing of scanning device 108, a scan direction of scanning device 108, a scan timing of scanning device 108, a pre-heat scan setting of scanning device 108, a post-heat scan setting of scanning device 108, a laser shot peening setting of consolidation device 104, a scanning strategy such as a scan order or a scan orientation for consolidation device 104, and/or a scan delay for consolidation device 104.

In addition, in the exemplary embodiment, control system 124 is configured to control one or more components of additive manufacturing system 100 based on build parameters associated with a build file stored, for example, in memory 128. In the exemplary embodiment, control system 124 is configured to control consolidation device 104 based on a build file associated with a component, such as component 102, to be fabricated with additive manufacturing system 100. More specifically, control system 124 is configured to control the position, movement, and scan speed of scanning device 108 based upon a predetermined path defined by a build file associated with component 102.

Control system 124 may also be configured to control other components of additive manufacturing system 100, including, without limitation, laser device 106. In one embodiment, for example, control system 124 controls the power output of laser device 106 based on build parameters associated with a build file.

In the exemplary embodiment, additive manufacturing system 100 is operated to fabricate component 102 from a computer modeled representation of the 3D geometry of component 102. The computer modeled representation may be produced in a computer aided design (CAD) or similar file. The CAD file of component 102 is converted into a layer-by-layer format that includes a plurality of build parameters for each layer of component 102. For example, a build layer of component 102 includes a particulate to be consolidated by additive manufacturing system 100. In the exemplary embodiment, component 102 is modeled in a desired orientation relative to the origin of the coordinate system used in additive manufacturing system 100. The geometry of component 102 is sliced into a stack of layers of a desired thickness, such that the geometry of each layer is an outline of the cross-section through component 102 at that particular layer location. Scan paths are generated across the geometry of a respective layer. The build parameters are applied along each scan path to fabricate that layer of component 102 from particulate 110 used to construct component 102. The steps are repeated for each respective layer of component 102 geometry. Once the process is completed, an electronic computer build file (or files) is generated, including all of the layers. The build file is loaded into control system 124 of additive manufacturing system 100 to control the system during fabrication of each layer.

After the build file is loaded into control system 124, additive manufacturing system 100 is operated to generate component 102 by implementing the layer-by-layer manufacturing process, such as a direct metal laser melting method. The exemplary layer-by-layer additive manufacturing process does not use a pre-existing article as the precursor to the final component, rather the process produces component 102 from a raw material in a configurable form, such as particulate 110. For example and without limitation, a steel component can be additively manufactured using a steel powder. Additive manufacturing system 100 enables fabrication of components, such as component 102, using a broad range of materials, for example and without limitation, metals, ceramics, glass, and polymers.

In the exemplary embodiment, control system 124 of additive manufacturing system 100 includes a build characteristic contribution evaluation (BCCE) module 130. BCCE module 130 is configured to generate a model of component 102 including a plurality of elements and a region of interest. In addition, BCCE module 130 is configured to apply a strain load to each element and generate a build characteristic contribution profile for each element based on the applied strain loads. The strain load may include a directional strain load, a strain tensor load, and/or any other load. In some embodiments, the BCCE module 130 is configured to apply different directional strain loads to each element. For example, the strain loads may be applied to each element in at least three different directions and a linear analysis may be used to determine the effect of a directional strain load in any direction. The directional strain loads may have the same or different magnitudes. In some embodiments, a characteristic contribution map is generated using strain loads of different magnitudes applied to the elements.

In some embodiments, BCCE module 130 determines the build contribution profile for each element by running a first simulation with the strain load applied to the element (or set of elements) and a second simulation without the strain load applied to the element (or set of elements). BCCE module 130 monitors the difference of one or more build characteristics of the region of interest during the first and second simulations. The build contribution profile is the difference between the build characteristic of the first simulation and the build characteristic of the second simulation.

In further embodiments, BCCE module 130 adds elements to a model in a layer-by-layer format. When each layer is added, BCCE module 130 applies a strain load to each element (or a set of elements) and determines the build characteristic of the region of interest when the strain load is applied to the element (or set of elements). BCCE module 130 compares the build characteristic related to the loaded element (or set of elements) to a build characteristic of the region of interest when the layer is in a base state. The base state of a layer may include loads applied to all elements, loads applied to some elements, or no loads applied to any elements. The build contribution profile is the difference between the build characteristic when the strain load is applied to the element and the build characteristic when the layer is in the base state. In alternative embodiments, BCCE module 130 may determine any build contribution profiles that enable additive manufacturing system 100 to operate as described herein.

Moreover, BCCE module 130 is configured to combine the build characteristic contribution profiles for the elements to generate a build characteristic contribution map. The build characteristic contribution map includes the build characteristic contribution profiles for the elements and relates the locations of the elements to the location of the at least one region of interest in the component 102.

In some embodiments, BCCE module 130 is configured to provide information for two-dimensional or three-dimensional scan processes. For example, BCCE module 130 utilizes strain loads in a two-dimensional plane to determine stress tensors (e.g., a vector having a unit length and a direction perpendicular to the surface of the element) for elements (or sets of elements). Using the determined stress tensors, BCCE module 130 is able to determine build parameters that provide desired build characteristics of component 102 for two-dimensional or three-dimensional scan strategies.

BCCE module 130 enables additive manufacturing system 100 to evaluate component 102 and improve build characteristics of component 102 by determining areas of component 102 that have the greatest effect on the build characteristics of the region of interest. As a result, control system 124 is able to adjust a build parameter of component 102 at the locations of contributory elements based on the build characteristic contribution profiles and, thereby, control the build characteristic in the region of interest. For example, in some embodiments, control system 124 adjusts an operating setting of consolidation device 104 such as a power setting of laser device 106, a speed of scanning device 108, a focus of scanning device 108, a scan spacing of scanning device 108, a scan direction of scanning device 108, a scan timing of scanning device 108, a pre-heat scan setting of scanning device 108, a post-heat scan setting of scanning device 108, a laser shot peening setting of consolidation device 104, a scan order or a scan orientation for consolidation device 104, a thickness of a consolidation layer, and/or a scan delay for consolidation device 104. In further embodiments, control system 124 adjusts a design parameter such as the type of material used for an area of component 102, the amount of material used for component 102, and/or the shape of component 102. Suitably, the design of component 102 is adjusted at the location of the identified contributory elements and not necessarily in the region of interest. The adjusted build parameter may be stored in the build file of component 102 and/or control system 124 may store the build parameters separate from the build file and retrieve the adjusted parameters during operation of additive manufacturing system 100. In alternative embodiments, control system 124 adjusts any build parameter that enables additive manufacturing system 100 to operate as described herein.

In some embodiments, additive manufacturing system 100 fabricates component 102 in a layer-by-layer process. Accordingly, the build characteristic contribution profiles of elements may be determined for each layer of component 102. For example, in some embodiments, BCCE module 130 determines the build characteristic contribution profiles of elements for a layer of the component and then BCCE module 130 applies an inherent strain to the plurality of elements in the layer. BCCE module 130 is able to compare the build characteristic at a region of interest with and without cooling strain and determine the contribution of each element to the build characteristic for each layer. Moreover, BCCE module 130 may determine separate build parameters for each layer based on the build characteristic contribution profiles of the layers. Additive manufacturing system 100 operates in accordance with the determined build parameters, which may be the same or different for each layer of the multi-layer build.

In addition, in the exemplary embodiment, additive manufacturing system 100 includes a user interface 132. User interface 132 enables a user to interact with additive manufacturing system 100. For example, user interface 132 may include, an output device such as a display and/or an input device. In some embodiments, the display and input device are combined in a single device such as a touchscreen. User interface 132 may enable a user to identify regions of interest in a model, input information relating to build parameters, select models for BCCE module 130 to evaluate, and/or input or receive any other information that enables additive manufacturing system 100 to operate as described herein.

Figure 2:
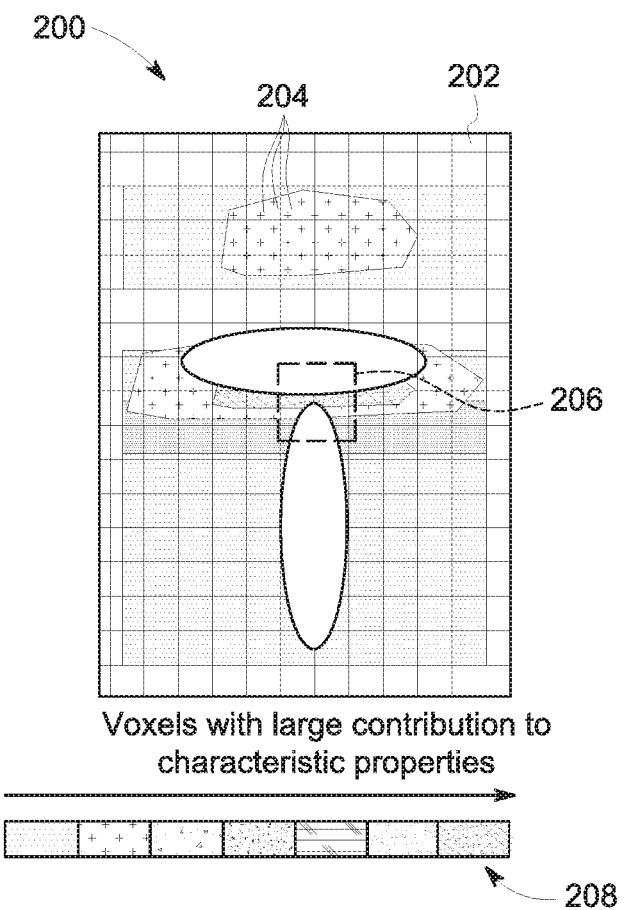
FIG. 2 is a schematic view of a model of a component fabricated using the additive manufacturing system shown in FIG. 1, the model having a build characteristic contribution map with a graduated scale.

FIG. 2 is a schematic view of a model 200 of a component 202 fabricated using additive manufacturing system 100 (shown in FIG. 1). In the exemplary embodiment, BCCE module 130 (shown in FIG. 1) is configured to generate a model such as model 200 of component 202. Model 200 includes a plurality of elements 204 and a region of interest 206. In the exemplary embodiment, elements 204 are three-dimensional voxels that constitute the volume of model 200. In the exemplary embodiment, each element 204 is a cube. Elements 204 are arranged in a plurality of layers. Model 200 includes any number of elements that provide the volume and shape of model 200. In alternative embodiments, model 200 includes any elements 204 that enable model 200 to function as described herein.

Model 200 has a build characteristic contribution map with a graduated scale 208. The build characteristic contribution map indicates the effect of elements 204 on a build characteristic of region of interest 206 of component 202. Graduated scale 208 is a measure of the relative values of elements' 204 contribution to the build characteristic from a low value to a high value. Accordingly, model 200 and the build characteristic contribution map enable control system 124 (shown in FIG. 1) and/or a user to sort elements 204 according to contributions to the build characteristic of region of interest 206 and to identify elements 204 which have the largest effect on the build characteristic. As a result, control system 124 is able to adjust the build parameters of component 202 based on individual elements 204 and provide increased control of the build characteristic of region of interest 206.

Figure 3:
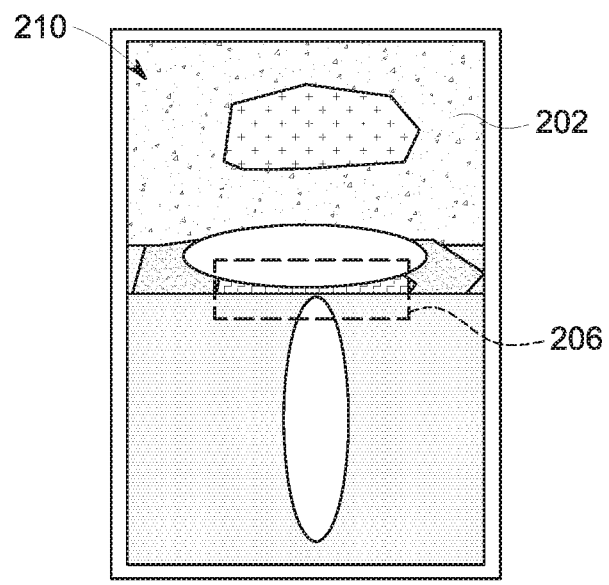
FIG. 3 is a schematic view of a model of the component shown in FIG. 2, the model having an initial build characteristic profile indicating a region of interest having an initial build characteristic.

FIG. 3 is a schematic view of a model 210 of component 202. Model 210 has a build characteristic profile and a region of interest 206. For example, region of interest 206 may be a location of a potential or predicted crack, defect, or other anomaly in component 202. Region of interest 206 may have a build characteristic such as an elevated stress and/or a displacement or distortion. Region of interest 206 may be identified by a user, using user interface 132 (shown in FIG. 1), and/or identified at least in part by control system 124 (shown in FIG. 1). For example, in some embodiments, control system 124 receives an input from user interface 132 indicating one or more regions of interest 206 in component 202 and control system 124 stores region of interest 206 in memory 128 (shown in FIG. 1). In further embodiments, control system 124 identifies one or more regions of interest 206 by recognizing areas of the build characteristic profile that have a build characteristic value that meets a threshold value. In alternative embodiments, control system 124 identifies region of interest 206 in any manner that enables additive manufacturing system 100 (shown in FIG. 1) to operate as described herein.

Also, in the exemplary embodiment, the build characteristic profile is a stress profile of component 202 and region of interest 206 is an area having a stress which is greater than a threshold value. In alternative embodiments, model 210 has any build characteristic profile that enables model 210 to function as described herein.

Figure 4:
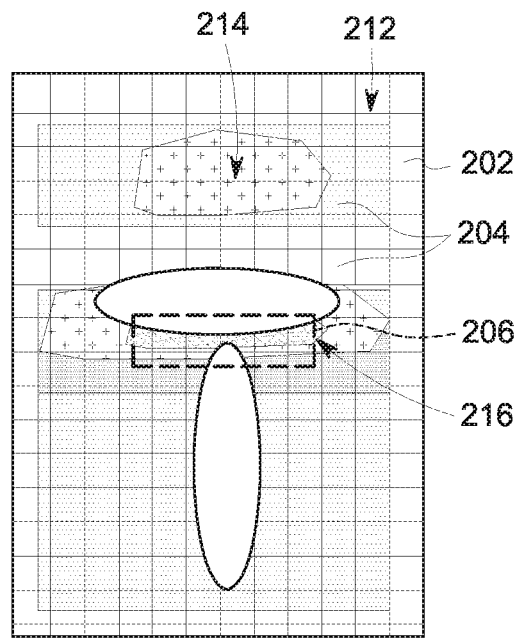
FIG. 4 is a schematic view of a model of the component shown in FIG. 2, the model having a build characteristic contribution map including build characteristic contribution profiles for a plurality of elements of the model.

FIG. 4 is a schematic view of a model 212 of component 202. Model 212 has a build characteristic contribution map including build characteristic contribution profiles for a plurality of elements 204 of model 212. The build characteristic contribution map illustrates the locations of the build characteristic contribution profiles of elements 204 relative to region of interest 206. Build characteristic contribution profiles indicate the effect of elements 204 on the build characteristic of region of interest 206. In the exemplary embodiment, build characteristic contribution profiles indicate the effect of a directional strain load applied individually to each element 204 on stress in region of interest 206. In alternative embodiments, build characteristic contribution map includes any build characteristic contribution profiles that enable model 212 to function as described herein. For example, in some embodiments, the build characteristic contribution profiles relate the strain on elements 204 to a displacement or distortion in region of interest 206.

In the exemplary embodiment, the build characteristic contribution map indicates some elements 204 have a significant effect on the build characteristic of region of interest 206. In particular, model 212 includes a first set of elements 214 and a second set of elements 216. Elements 214, 216 each have a greater effect on the build characteristic of region of interest 206 than other elements 204. The build characteristic of region of interest 206 may be adjusted by altering build parameters of component 202 based on elements 214, 216. As a result, the build characteristic contribution map enables the build parameters of component 202 to be controlled more efficiently and with a greater effect than systems that alter build parameters based on the profile of the entire component.

Figure 5:
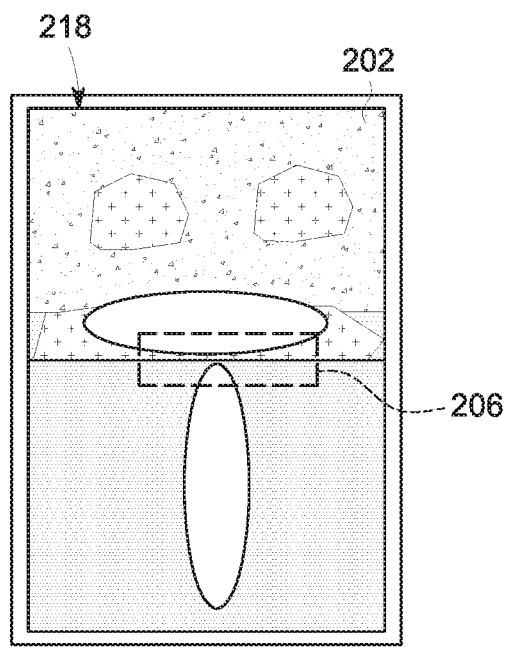
FIG. 5 is a schematic view of a model of the component shown in FIG. 2, the model having a build characteristic profile indicating a region of interest having an altered build characteristic in comparison to the build characteristic of the region of interest of the model shown in FIG. 3.

FIG. 5 is a schematic view of a model 218 of component 202. Model 218 has a build characteristic profile and region of interest 206. Region of interest 206 in model 218 has an altered build characteristic in comparison to the build characteristic of region of interest 206 in model 210 (shown in FIG. 3). The build characteristic of region of interest 206 has been altered by adjusting a build parameter of component 202 based on the build characteristic contribution map shown in FIG. 4. In the exemplary embodiment, the build characteristic is a stress and region of interest 206 in model 218 has a reduced stress in comparison to region of interest 206 in model 210 (shown in FIG. 3).

Figure 6:
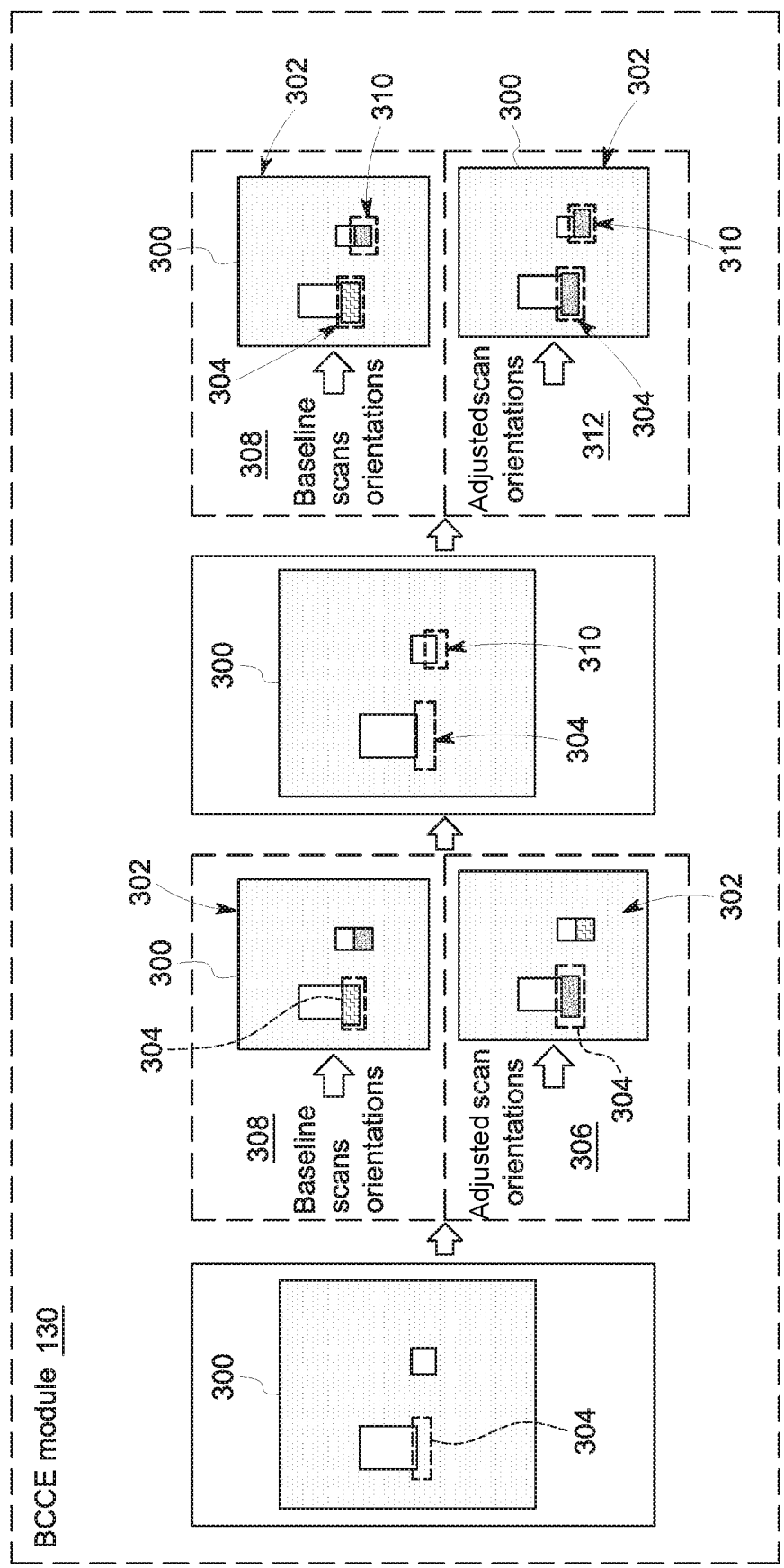
FIG. 6 is a flow chart of a process of determining, using a build characteristic contribution evaluation module, a scan strategy for fabricating a component using the additive manufacturing system shown in FIG. 1.

FIG. 6 is a flow chart of a process of determining, using BCCE module 130, a build parameter (e.g., a scan strategy) for fabricating a component 300 using additive manufacturing system 100 (shown in FIG. 1). BCCE module 130 generates a model 302 of component 300 and receives an input from a user identifying one or more regions of interest 304 within model 302. BCCE module 130 may also receive inputs relating to desired characteristics for region of interest 304, criteria for adjustments to the characteristics of region of interest 304, and/or comparative weights for the adjustments to build characteristics of regions of interest 304. For example, in some embodiments, the user may specify that stress in a particular direction is to be minimized and/or provide a maximum amount of scan delay to be applied.

BCCE module 130 determines a first adjusted scan strategy 306 based on region of interest 304 and stress contribution profiles of elements of model 302. For example, first adjusted scan strategy 306 includes adjusted scan orientations at locations within component 300 that relate to elements (or sets of elements) of model 302 that contribute to the build characteristic. Specifically, in first adjusted scan strategy 306 scan orientations for individual locations of the scan path related to elements of model 302 are determined based on the stress contribution profiles. In further embodiments, first adjusted scan strategy 306 includes a scan delay at locations related to one or more elements (or sets of elements) of model 302. In contrast, baseline scan strategy 308 is determined without factoring stress contribution profiles of elements of model 302. For example in some embodiments, baseline scan strategy 308 includes scan paths that are fixed layer to layer for locations throughout model 302. In further embodiments, scan paths of adjacent layers in baseline scan strategy 308 are offset by a set angle measure (e.g., 67°). In comparison to baseline scan strategy 308, first adjusted scan strategy 306 provides a reduced stress in region of interest 304 because first adjusted scan strategy 306 is determined based on stress contribution profiles.

After BCCE module 130 determines first adjusted scan strategy 306, BCCE module 130 provides first adjusted scan strategy 306 to the user and BCCE module 130 may receive user input relating to model 302 and first adjusted scan strategy 306. For example, the user may select one or more regions of interest 304 that are different from the initially selected regions of interest 304. In the exemplary embodiments, a second region of interest 310 is selected by the user after evaluating the stress profiles resulting from first adjusted scan strategy 306. In the stress profile, second region of interest 310 has an elevated stress caused by first adjusted scan strategy 306. Accordingly, selecting first region of interest 304 and second region of interest 310 causes BCCE module 130 to determine a second adjusted scan strategy 312 that reduces stress in second region of interest 310. Second adjusted scan strategy 312 includes scan orientations for individual locations of the scan path related to elements of model 302, a scan delay at locations related to one or more elements (or sets of elements) of model 302, and/or any other operating setting of consolidation device 104 (shown in FIG. 1). In some embodiments, BCCE module 130 determines second adjusted scan strategy 312 based on the stress contribution profiles used to determine first adjusted scan strategy 306. As a result, the time required to determine second adjusted scan strategy 312 is reduced in comparison to a process that does not use already determined stress contribution profiles.

Figure 7:
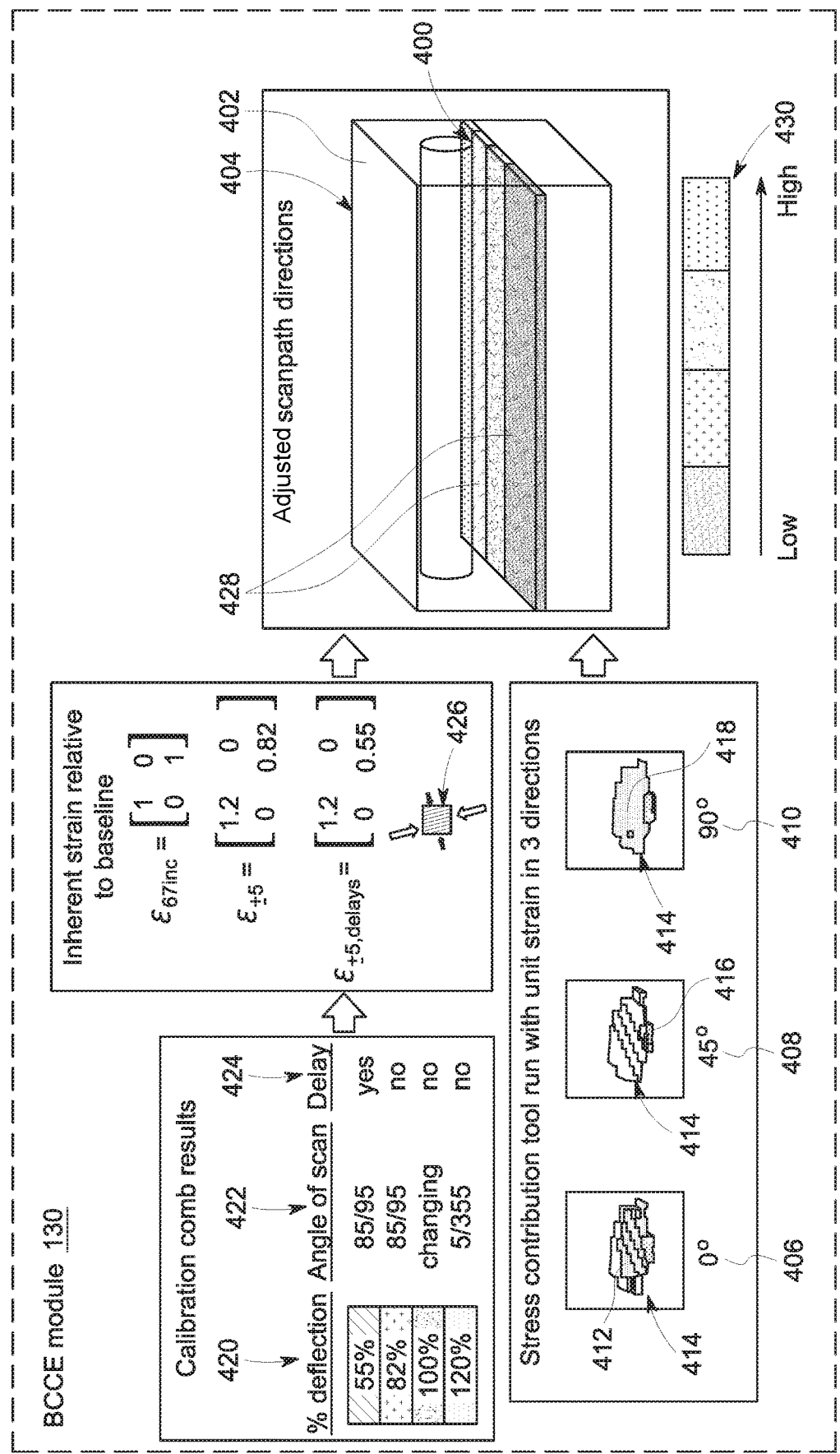
FIG. 7 is a flow chart of a process of determining, using a build characteristic contribution evaluation module, a stress contribution profile of a component fabricated using the additive manufacturing system shown in FIG. 1.

FIG. 7 is a flow chart of a process of determining, using BCCE module 130, a build characteristic contribution map (e.g., stress contribution map 400) of a component 402 fabricated using additive manufacturing system 100 (shown in FIG. 1). BCCE module 130 applies at least one strain load to at least one element of a model 404 of component 402 and determines the stress contribution for each strain load. For example, BCCE module 130 applies a first strain load 406 to each element (or set of elements) in a first direction (e.g., 0°), applies a second strain load 408 to each element (or set of elements) in a second direction (e.g., 45°), and applies a third strain load 410 to each element (or set of elements) in a third direction (e.g., 90°). BCCE module 130 determines a build characteristic related to at least one region of interest when each strain load is applied to each element (or set of elements). For example, BCCE module 130 determines a first stress 412 in region of interest 414 when first strain load 406 is applied to at least one element, a second stress 416 in region of interest 414 when second strain load 408 is applied to the at least one element, and a third stress 418 in region of interest 414 when third strain load 410 is applied to the at least one element. In alternative embodiments, BCCE module 130 applies any strain load to elements that enables BCCE module 130 to function as described herein.

In addition, BCCE module 130 determines baseline values of build characteristics 420 of region of interest 414 in model 404 based on a plurality of scan orientations 422 and scan delays 424. Also, BCCE module 130 determines inherent strain 426 of model 404 relative to baseline values of build characteristics 420. BCCE module 130 determines build characteristic contribution profiles based on unit strain loads 406, 408, 410 and inherent strain 426. For example, BCCE module 130 determines build characteristic contributions (e.g., stress or displacement contributions) by calculating a difference between the build characteristic of region of interest 414 when inherent strain 426 is applied to model 404 and when unit strain loads 406, 408, 410 are applied to each element (or set of elements). BCCE module 130 determines a build characteristic contribution profile 428 for each element (or set of elements) based on the build characteristic contributions. In some embodiments, BCCE module 130 determines build characteristic contributions of unit strain loads 406, 408, 410 and extrapolates the build characteristic contributions to determine build characteristic contributions of other unit strain loads (e.g., unit strain loads in other directions).

BCCE module 130 combines build characteristic contribution profiles 428 and generates a build characteristic contribution map (e.g., stress contribution map 400) relating locations of build characteristic contribution profiles 428 to locations of elements and regions of interest. In the exemplary embodiment, each build characteristic contribution profile 428 of stress contribution map 400 includes at least one vector that represents an adjusted scan orientation at the location of an element (or set of elements). In addition, build characteristic contribution profile 428 may include a graduated scale 430. Graduated scale 430 provides a relative measure of the contribution of elements to the build characteristic of region of interest 414 from a low value to a high value.

BCCE module 130 is able to determine a build parameter according to build characteristic contribution map 400 and provide a desired adjustment to the build characteristic. For example, BCCE module 130 may determine a scan strategy including at least one of a scan orientation and/or a scan delay at an element (or set of elements) indicated by build characteristic contribution map 400. In particular, the build parameter may be determined based at least on the build characteristic contribution profiles 428 of those elements (or sets of elements) indicated as having a relatively high effect on the build characteristic relative to region of interest 414.

Figure 8:
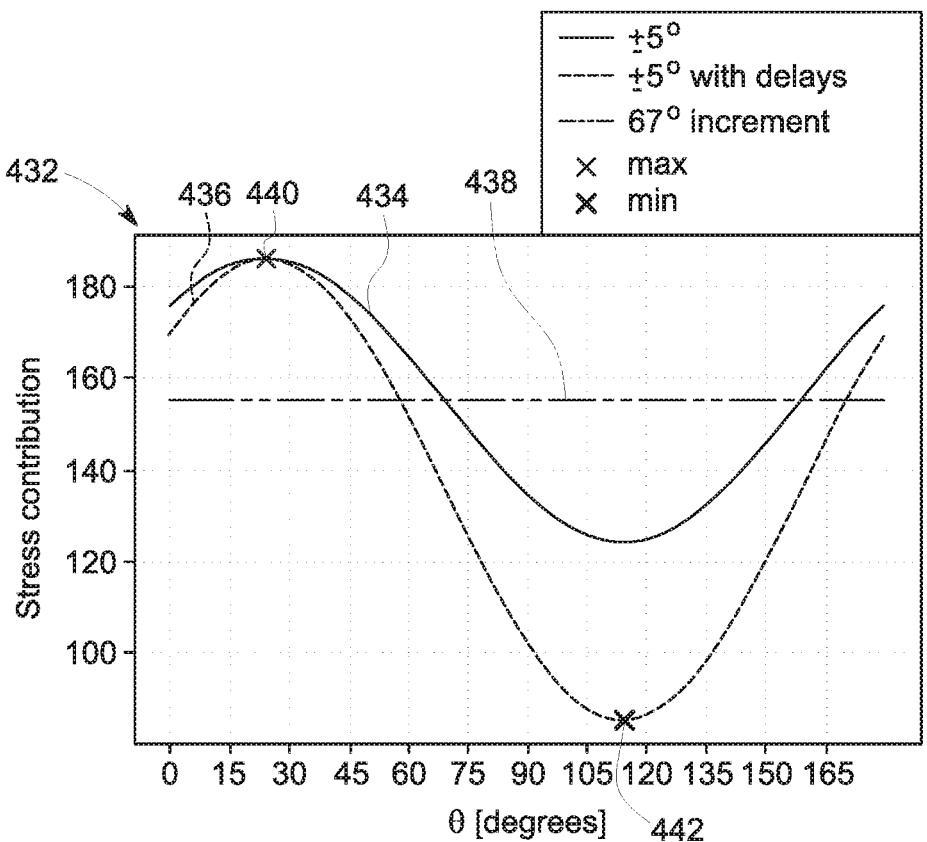
FIG. 8 is a graphical representation of a stress contribution profile of an element of the component shown in FIG. 7.

FIG. 8 is a graphical representation of a stress contribution profile 432 of an element of component 402 (shown in FIG. 7). FIG. 8 includes an X-axis indicating an angle measure (degrees) for a scan direction at a location of the element (or set of elements), and a Y-axis indicating a stress contribution value (percentage) relative to a baseline value. FIG. 8 includes a first curve 434 representing a first scan orientation for model 404, a second curve 436 representing a second scan orientation for model 404, and a third curve 438 representing a third scan orientation for model 404. Specifically, first curve 434 represents a scan orientation that varies +/−5° layer to layer. Second curve 436 represents a scan orientation that varies +/−5° layer to layer and includes scan delays. Third curve 438 represents a scan orientation that varies by approximately 67° layer to layer.

First curve 434 and second curve 436 vary based on the scan direction at the location of the element (or set of elements). For example, first curve 434 and second curve 436 have a maximum point 440 which corresponds to a maximum stress contribution of approximately 185° and a scan direction of approximately 25°. Second curve 436 has a minimum point 442 which corresponds to a minimum stress contribution of approximately 85% and a scan direction of approximately 115°. Accordingly, BCCE module 130 (shown in FIG. 1) may determine a scan strategy that includes a scan direction of approximately 25° at the location of the element (or set of elements) to provide an increase in the build characteristic value at the region of interest. Alternatively, BCCE module may determine a scan strategy that includes a scan direction of approximately 115° at the location of the element (or set of elements) to provide a decrease in the build characteristic value at the region of interest. To provide the largest decrease in the build characteristic value at the region of interest, BCCE module 130 could generate a scan strategy including the second scan orientation (i.e., a scan orientation that varies +/−5° layer to layer and includes scan delays) and a scan direction of approximately 115° at the location of the element (or set of elements) because second curve provides the lowest stress contribution of stress contribution profile 432.

Figure 9:
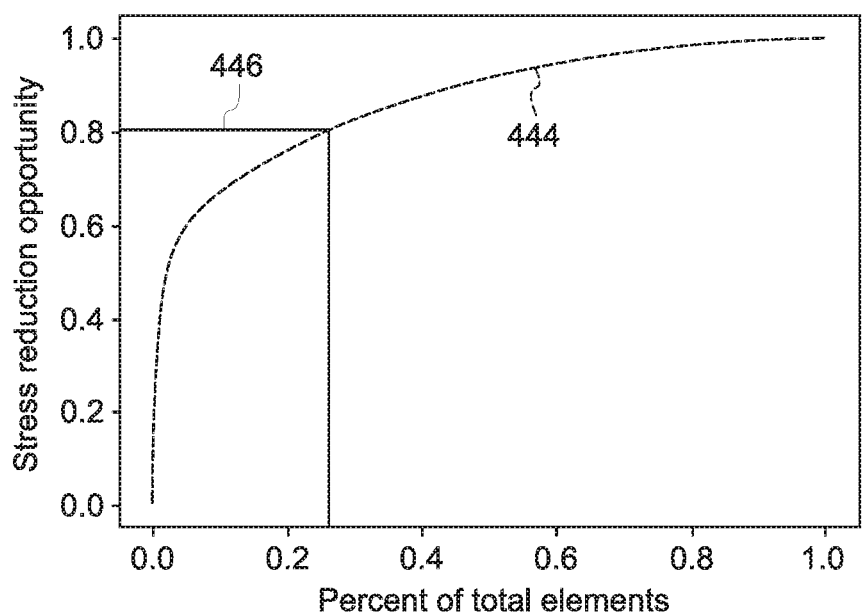
FIG. 9 is a graphical representation of potential stress reduction for the component shown in FIG. 7.

FIG. 9 is a graphical representation of potential stress reductions for component 402 (shown in FIG. 7). FIG. 9 includes an X-axis indicating ratios of selected elements (or sets of elements) to the total number of elements, and a Y-axis indicating stress reduction as a percentage of a total stress reduction opportunity. The total stress reduction opportunity is a maximum stress reduction that would occur if the scan strategy was adjusted based on the stress contribution profiles for all elements. FIG. 9 also includes a curve 444 representing possible scan strategies for model 404. Curve 444 slopes sharply upward as the ratio of elements increases from 0 to 20% and the stress contribution increases from 0 to 80%. Curve 444 flattens out as the stress reduction approaches the total stress reduction opportunity and the ratio of elements increases beyond 25%. A line 446 represents a scan strategy which provides a stress reduction of approximately 80% of the total stress reduction opportunity and an element ratio of approximately 25%. Accordingly, line 446 provides a possible scan strategy that provides the largest stress reduction per selected element (or sets of elements). In some embodiments, BCCE module 130 (shown in FIG. 1) determines a scan strategy that provides less than the total stress reduction opportunity but that is considered more efficient because less than the total number of elements (or set of elements).

Figure 10:
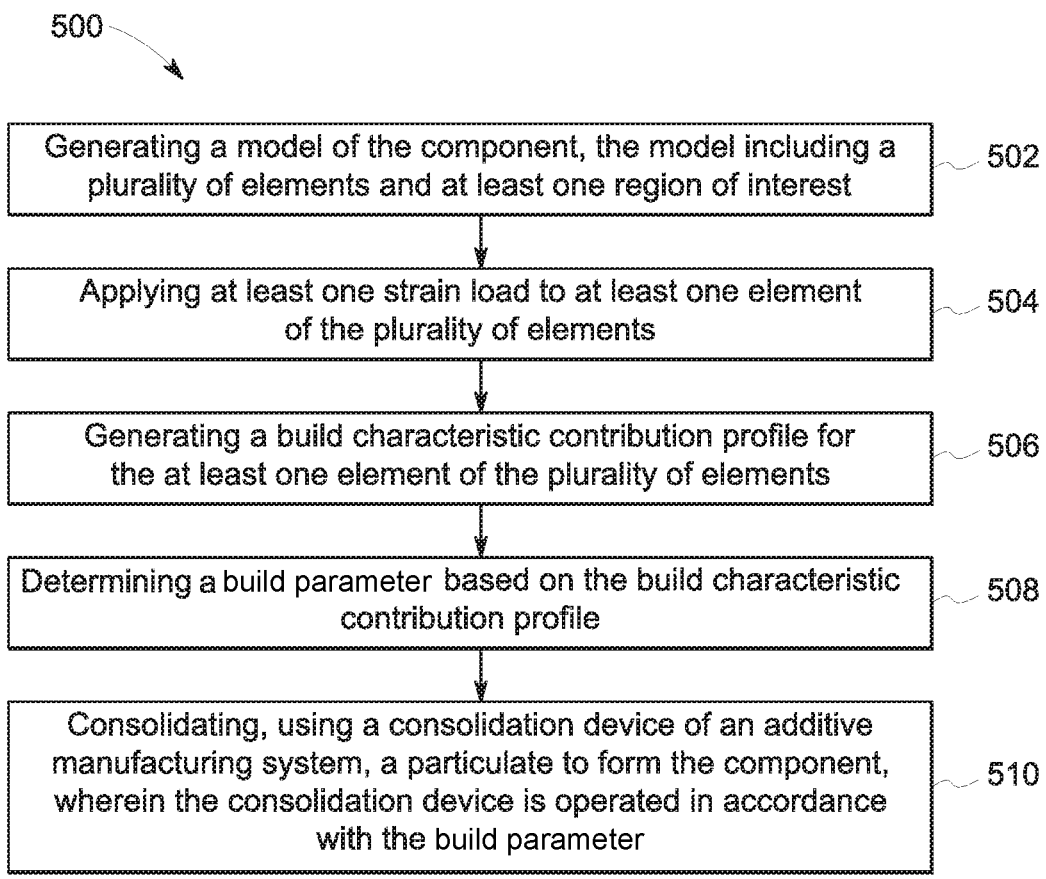
FIG. 10 is a flow chart of an exemplary method of fabricating a component using the additive manufacturing system shown in FIG. 1.

FIG. 10 is a flow chart of an exemplary method 500 of fabricating a component (e.g., component 102 shown in FIG. 1, component 202 shown in FIG. 2, component 300 shown in FIG. 6, or component 402 shown in FIG. 7) using additive manufacturing system 100. In reference to FIGS. 1-7 and 10, method 500 generally includes generating 502 a model of the component. The model includes a plurality of elements 204 and region of interest 206. Also, method 500 includes applying 504 at least one strain load to at least one element 204 of the plurality of elements 204. In some embodiments, control system 124 applies a first strain load to the at least one element 204 in a first direction, applies a second strain load to the at least one element 204 in a second direction, and applies a third strain load to the at least one element 204 in a third direction. In further embodiments, control system 124 is configured to determine a first stress contribution of the first strain load, determine a second stress contribution of the second strain load, and determine a third stress contribution of the third strain load.

Also, method 500 includes generating 506 a build characteristic contribution profile for the at least one element 204 of the plurality of elements. For example, control system 124 determines the build characteristic contribution profile based on at least one of the first stress contribution, the second stress contribution, and the third stress contribution. In some embodiments, control system 124 determines a build characteristic contribution profile for each element 204 (or set of elements 204). Each build characteristic contribution profile includes an effect of the directional strain load applied to the at least one element 204 on a build characteristic of at least one location within the at least one region of interest 206. In some embodiments, the build characteristic contribution profile includes a stress contribution profile that relates stress contributions of element 204 to potential scan directions of consolidation device 104 at the location of element 204.

In some embodiments, method 500 includes combining the build characteristic contribution profiles of elements 204 and generating a build characteristic contribution map. In further embodiments, method 500 includes comparing the build characteristic contribution profiles and sorting elements 204 according to the build characteristic contribution profiles.

In addition, method 500 includes determining 508 a build parameter (e.g., a scan strategy) based on the build characteristic contribution profile. For example, in some embodiments, control system 124 adjusts at least one of a scan path direction at the location of the at least one element 204 and a scan delay at the location of the at least one element 204.

Moreover, method 500 includes consolidating 510, using consolidation device 104 of additive manufacturing system 100, particulate 110 to form the component. Consolidation device 104 operates in accordance with the determined build parameter. For example, in some embodiments, additive manufacturing system 100 deposits particulate 110 on build platform 114 and consolidation device 104 consolidates particulate 110 to form component 102 using an adjusted scan path direction at the location of at least one element 204 and/or a scan delay at the location of the at least one element 204. In alternative embodiments, the component is fabricated in any manner that enables additive manufacturing system 100 to operate as described herein.

The embodiments described herein include an additive manufacturing system including a build characteristic contribution evaluation module. The build characteristic contribution evaluation module is configured to generate a model of the component with a plurality of elements and at least one region of interest. For example, the elements may be three-dimensional elements such as voxels or tetrahedral elements that are arranged in an array to represent a three-dimensional object. The build characteristic contribution evaluation module is configured to determine build characteristic contribution profiles for the elements and identify one or more elements that contribute to the build characteristic of the region of interest. For example, the build characteristic contribution profiles may include stress contribution profiles that relate stress contributions of the one or more elements to potential build parameters (e.g., scan directions of the consolidation device) at the location of the elements. The build characteristic contribution evaluation module is configured to determine and output a build parameter for the component based on the build characteristic contribution profiles. For example, the build characteristic contribution evaluation module may be configured determine a scan strategy including at least one of a scan path direction at the location of the at least one element and a scan delay at the location of the at least one element. A consolidation device of the additive manufacturing system may operate in accordance with the scan strategy to consolidate a particulate to form the component. Also, the build characteristic contribution evaluation module may be configured to determine at least one of a power setting of a consolidation device, a focus setting of a consolidation device, a scan spacing, a layer thickness, and/or any other build parameter. As a result, the additive manufacturing system is able to identify elements that will provide a desired change in the build characteristics of the region of interest and fabricate the components in accordance with a build parameter determined based on the identified elements to control the build characteristics of the additively manufactured component.

An exemplary technical effect of the methods, systems, and apparatus described herein includes at least one of: a) reducing anomalies in components fabricated using an additive manufacturing process by enabling the identification and control of contributory regions for the anomalies, b) providing real-time feedback and control of build characteristic of components fabricated using an additive manufacturing system, c) enabling the fabrication of components with complicated geometries by providing improved control of build characteristics of the component, d) reducing the cost of additively manufacturing a component, and e) enabling more precise and reliable adjustment of a build characteristic of component by providing a simulation which identifies regions that contribute to the build characteristic.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Exemplary embodiments of additive manufacturing systems are described above in detail. The additive manufacturing systems, and methods of using and manufacturing such systems are not limited to the specific embodiments described herein, but rather, components of systems and/or steps of the methods may be utilized independently and separately from other components and/or steps described herein. For example, the methods may also be used in combination with other additive manufacturing systems, and are not limited to practice with only the additive manufacturing systems, and methods as described herein. Rather, the exemplary embodiment can be implemented and utilized in connection with many other additive manufacturing systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An additive manufacturing system comprising:
   a build platform configured to receive a particulate;
   a consolidation device configured to consolidate the particulate to form a component; and
   a control system communicatively coupled to the consolidation device and configured to control operation of the consolidation device, said control system to:
      generate a model of a component, the model including a plurality of elements arranged to represent the component and a region of interest, the plurality of elements forming at least one layer, the layer including at least a first element and a second element;
      apply a modeled load to the first element of the plurality of elements;
      generate a build characteristic contribution profile based on the modeled load, the build characteristic contribution profile representing a modeled effect of the modeled load applied to the first element on a build characteristic of a location within the region of interest, wherein the build characteristic contribution profile is determined for the first element by running a first simulation with the modeled load applied to the first element to determine a first build characteristic value and a second simulation without the modeled load applied to the first element to determine a second build characteristic value, wherein the build characteristic contribution profile is a difference between the first build characteristic value of the first simulation and the second build characteristic value of the second simulation; and determine a build parameter for operation of the additive manufacturing system based at least partly on the build characteristic contribution profile, the control system to operate the consolidation device according to the determined build parameter to consolidate the particulate to form the component.

2. The additive manufacturing system in accordance with claim 1, wherein the modeled load is modeled as a first load, a second load, and a third load, and wherein said control system is configured to:

apply the first load to the first element of the plurality of elements in a first direction;

apply the second load to the first element of the plurality of elements in a second direction; and apply the third load to the first element of the plurality of elements in a third direction.

3. The additive manufacturing system in accordance with claim 2, wherein said control system is configured to:

determine a first stress contribution of the first load;

determine a second stress contribution of the second load; and determine a third stress contribution of the third load, wherein the build characteristic contribution profile is determined based on at least one of the first stress contribution, the second stress contribution, or the third stress contribution.

4. The additive manufacturing system in accordance with claim 1, wherein the build characteristic contribution profile includes a stress contribution profile representing stress contributions of unit loads applied to the first element to a stress at the region of interest.

5. The additive manufacturing system in accordance with claim 4, wherein the build parameter includes at least one of a scan path direction at the location of the first element, a scan delay at the location of the first element, a power setting of the consolidation device, a focus setting of the consolidation device, a scan spacing, or a layer thickness.

6. The additive manufacturing system in accordance with claim 1, wherein said control system is further configured to generate a plurality of the build characteristic contribution profiles for the plurality of elements and combine the build characteristic contribution profiles to generate a build characteristic contribution map of the component.

7. The additive manufacturing system in accordance with claim 1, wherein said control system is further configured to identify the first element of the plurality of elements as a first contributory element based on the build characteristic contribution profile, and determine the build parameter based on the build characteristic contribution profile of the first contributory element.

8. The additive manufacturing system in accordance with claim 7, wherein the first contributory element is located outside of the region of interest in the model.

9. The additive manufacturing system in accordance with claim 7, wherein said control system is further configured to identify a second element of the plurality of elements as a second contributory element based on the build characteristic contribution profile, and adjust the build parameter based on the build characteristic contribution profile of the second contributory element.

10. The additive manufacturing system in accordance with claim 1, wherein the plurality of elements are arranged in a plurality of layers, and wherein said control system is configured to determine build characteristic contribution profiles for the plurality of elements in each layer and determine an inherent strain for the plurality of elements in each layer, the inherent strain determined for the build characteristic contribution profiles relative to a baseline value.

11. A method of fabricating a component using an additive manufacturing system including a build platform configured to receive a particulate, and a consolidation device configured to consolidate the particulate to form the component, the method comprising:

generating a model of the component, the model including a plurality of elements arranged to represent the component and a region of interest, the plurality of elements forming at least one layer, the layer including at least a first element and a second element;

applying a modeled load to the first element of the plurality of elements;

generating a build characteristic contribution profile based on the modeled load, the build characteristic contribution profile representing a modeled effect of the modeled load applied to the first element on a build characteristic of a location within the region of interest, wherein the build characteristic contribution profile is determined for the first element by running a first simulation with the modeled load applied to the first element to determine a first build characteristic value and a second simulation without the modeled load applied to the first element to determine a second build characteristic value, wherein the build characteristic contribution profile is a difference between the first build characteristic value of the first simulation and the second build characteristic value of the second simulation; and determining a build parameter for operation of the additive manufacturing system based on the build characteristic contribution profile, the operation including operating the consolidation device according to the determined build parameter to consolidate the particulate to form the component.

12. The method in accordance with claim 11, wherein the modeled load is modeled as a first load, a second load, and a third load, and wherein applying the modeled load to the first element of the plurality of elements comprises:

applying the first load to the first element of the plurality of elements in a first direction;

applying the second load to the first element of the plurality of elements in a second direction; and applying the third load to the first element of the plurality of elements in a third direction.

13. The method in accordance with claim 12 further comprising:

determining a first stress contribution of the first load;

determining a second stress contribution of the second load; and determining a third stress contribution of the third load, wherein the build characteristic contribution profile is determined based on at least one of the first stress contribution, the second stress contribution, or the third stress contribution.

14. The method in accordance with claim 11, wherein generating a build characteristic contribution profile for the first element of the plurality of elements comprises generating a stress contribution profile representing stress contributions of unit loads applied to the first element to a stress at the region of interest.

15. The method in accordance with claim 14, wherein determining the build parameter based on the build characteristic contribution profile comprises determining at least one of a scan path direction at the location of the first element, a scan delay at the location of the first element based on the stress contribution profile, a power setting of the consolidation device, a focus setting of the consolidation device, a scan spacing, or a layer thickness.

16. The method in accordance with claim 11, further including generating a plurality of build characteristic contribution profiles for the plurality of elements, and combining the build characteristic contribution profiles to generate a build characteristic contribution map of the component.

17. The method in accordance with claim 11, further including generating a plurality of build characteristic contribution profiles for the plurality of elements, the plurality of elements arranged in a plurality of layers, and determining an inherent strain for the plurality of elements in each layer, the inherent strain determined for the build characteristic contribution profiles relative to a baseline value.

18. A build characteristic contribution evaluation module for an additive manufacturing system including a build platform configured to receive a particulate, and a consolidation device configured to consolidate the particulate to form a component, the build characteristic contribution evaluation module comprising at least one processor in communication with at least one memory device, said at least one processor programmed to:
generate a model of a component, the model including a plurality of elements arranged to represent the component and a region of interest, the plurality of elements forming at least one layer, the layer including at least a first element and a second element;
apply a modeled load to the first element of the plurality of elements;
generate a build characteristic contribution profile based on the modeled load, the build characteristic contribution profile representing a modeled effect of the modeled load applied to the first element on a build characteristic of a location within the region of interest, wherein the build characteristic contribution profile is determined for the first element by running a first simulation with the modeled load applied to the first element to determine a first build characteristic value and a second simulation without the modeled load applied to the first element to determine a second build characteristic value, wherein the build characteristic contribution profile is a difference between the first build characteristic value of the first simulation and the second build characteristic value of the second simulation; and
determine a build parameter for operation of the additive manufacturing system based at least partly on the build characteristic contribution profile, the operation including operating the consolidation device according to the determined build parameter to consolidate the particulate to form the component.

19. The build characteristic contribution evaluation module in accordance with claim 18, wherein the modeled load is modeled as a first load, a second load, and a third load, and wherein said at least one processor is further programmed to:
apply the first load to the first element of the plurality of elements in a first direction;
apply the second load to the first element of the plurality of elements in a second direction;
apply the third load to the first element of the plurality of elements in a third direction;
determine a first stress contribution of the first load;
determine a second stress contribution of the second load; and
determine a third stress contribution of the third load, wherein the build characteristic contribution profile is determined based on at least one of the first stress contribution, the second stress contribution, or the third stress contribution.

20. The build characteristic contribution evaluation module in accordance with claim 19, wherein said at least one processor is further programmed to:
generate a stress contribution profile representing stress contributions of unit loads applied to the first element to a stress at the region of interest, and wherein the build parameter includes at least one of a scan path direction at the location of the first element, a scan delay at the location of the first element, a power setting of the consolidation device, a focus setting of the consolidation device, a scan spacing, or a layer thickness.

* * * * *